United States Patent

[11] 3,604,452

| [72] | Inventors | Robert A. Daniels<br>1103 West J 7;<br>Norman B. Foster, 1500 Kildare St.;<br>Robert P. Yeomans, 43715 North<br>Harwood, all of Lancaster, Calif. 93534 |
|------|-----------|---|
| [21] | Appl. No. | 703,071 |
| [22] | Filed | Feb. 5, 1968 |
| [45] | Patented | Sept. 14, 1971 |

[54] PRESSURE CONTROL DEVICE
3 Claims, 9 Drawing Figs.

[52] U.S. Cl. .................................................. 137/523,
98/1.5, 137/81, 137/537, 251/333
[51] Int. Cl. .................................................. F16k 15/18
[50] Field of Search ........................................... 137/81,
495, 523, 537, 536; 251/333, 334; 98/1.5

[56] References Cited
UNITED STATES PATENTS

| 56,409 | 7/1866 | Hamilton | 137/536 |
|--------|--------|----------|---------|
| 995,815 | 6/1911 | Temple | 137/537 X |
| 2,063,821 | 12/1936 | McKenzie | 137/536 X |
| 2,451,278 | 10/1948 | Cruzan | 98/1.5 |
| 2,622,621 | 12/1952 | Tomlinson | 251/333 X |
| 3,289,686 | 12/1966 | Tyer, Jr. | 137/537 X |

*Primary Examiner*—Robert G. Nilson
*Attorney*—Robert O. Richardson

ABSTRACT: A device for regulating fluid pressure in a container. Gross changes in flow through the container can be made with a minimum fluctuation in pressure. For example, the rate of flow may be increased four times with an increase in pressure of only one-sixteenth the original pressure.

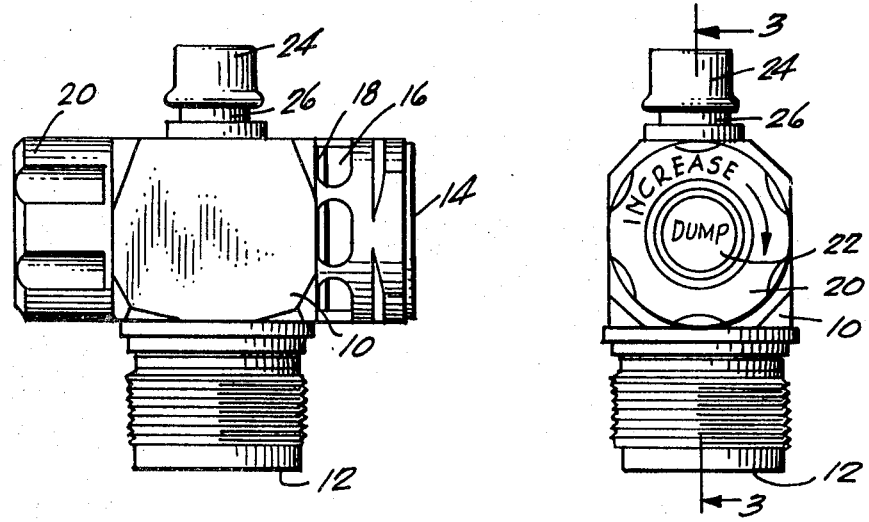
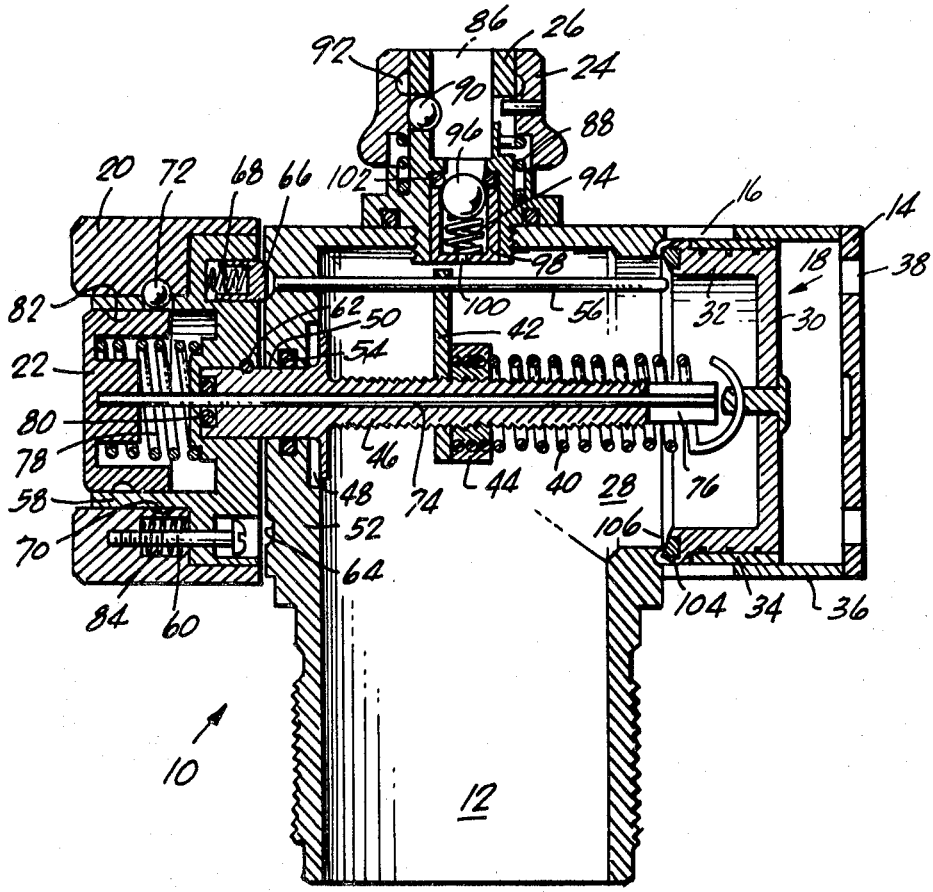

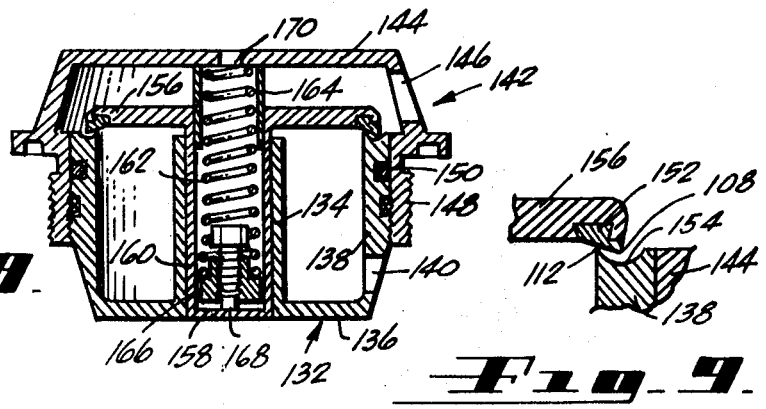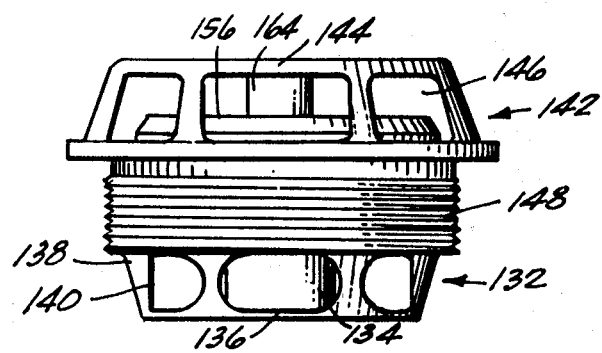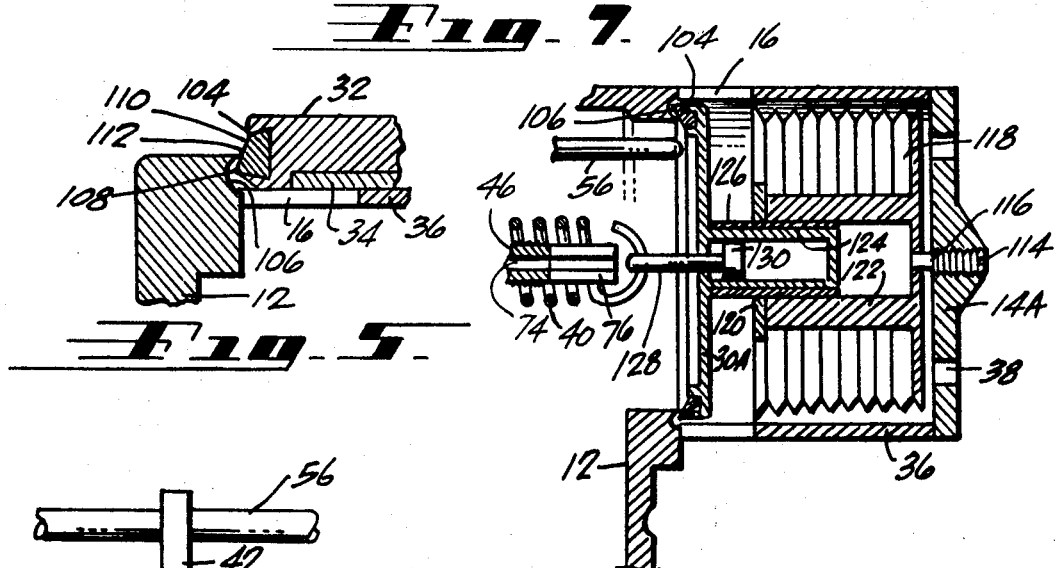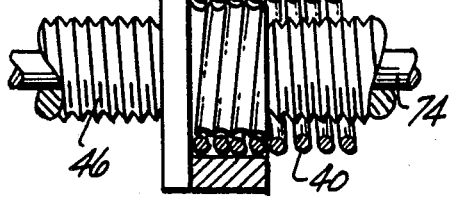

3,604,452

PRESSURE CONTROL DEVICE

BACKGROUND OF THE INVENTION

Pressure control devices have been used ever since it has been possible to pressurize an enclosure. For example, steam engines have required pressure relief valves in order to avoid boiler explosions by releasing the steam pressure when it is in excess of a certain amount. Both in deep sea diving and in outer space man-'s environment required his wearing a pressurized suit. In the case of deep sea diving the internal pressure was necessary to counteract the external pressure and, thus, enable the person wearing the suit to perform underwater activities. Similarly, in a rarified atmosphere a person needs pressurization to avoid physical impairment. In the past, pressure control devices have been used even with certain deficiencies, one of which is an increase in pressure in the suit with an increase in cooling airflow. Airspace protective systems called for a continuous flow of air between the outer garment and the person's skin to pass off moisture and to hold the body temperature at an acceptable level. This requires varying rates of airflow. The problem in the past has been that the pressure control device used could not maintain the desired preset pressure with the necessary variation in airflow. When the pressure is too low the man suffers the dangers typical of rarified atmosphere, and if the pressure is too great it impedes mobility and enhances the danger of rupture of the suit. For these reasons it has been established that the pressurization in an outer space garment may not fluctuate more than plus or minus 0.2 pounds from the selected pressure. This pressure is 3.7 pounds when oxygen only is used and 5 pounds when a mixture of gases is used.

SUMMARY OF THE INVENTION

The pressure control device comprising the present invention includes a piston within the air path through a housing. This piston is actuated by air pressure when it exceeds a preset pressure determined by the position of a tension spring. The spring tension can be set by rotation of a pressure adjusting knob. A quick release or dump mechanism is incorporated for opening the air path in the housing to permit unrestricted airflow., when desired. This mechanism may be returned to normal operation without adjustment so that after the release operation has been accomplished the pressure control device will again regulate the pressure at the same preset value. An automatic pressure flow compensating seal arrangement provides a fluid flow pressure closely approximating the pressure necessary to open the air path.

BRIEF DESCRIPTION OF THE DRAWINGS

For a more complete understanding of the present invention, reference is now made to the drawings wherein:

FIG. 1 is a side view of one form of pressure control device;

FIG. 2 is an end view

FIG. 3 is an elevational view in section showing the relationship of the various internal parts;

FIG. 4 is an enlarged elevational view, partly in section, showing the method of retaining and adjusting the spring, and showing the dump push rod movable within the spring tension pressure-adjusting screw;

FIG. 5 is an enlarged partial sectional view showing the sealing arrangement;

FIG. 6 is an enlarged elevational view of a modification utilizing a fail-safe aneroid control;

FIG. 7 is a side view of an alternate form of pressure control device;

FIG. 8 is an elevational sectional view of the control device shown in FIG. 7; and FIG. 9 is an enlarged partial sectional view showing its sealing arrangement.

Side and end views of one form of pressure control device are shown in FIGS. 1 and 2. Here pressure control hosing 10 includes an externally threaded inlet port 12 adapted to be fitted to an appropriate container connection, not shown, such as that on a space suit for example. This housing has an exhaust cover 14 having exhaust openings 16 therein. Piston 18 moves laterally, across the openings 16 therein. Piston 18 moves laterally, across the openings 16 to vary the cross-sectional area of the openings through which air may escape. This regulates the back pressure and, thus, the pressure of the container to which the pressure-regulating device is attached. A pressure-adjusting knob 20 (which also serves as a dump button release as will be explained hereinafter) is rotatable to adjust the pressure against which the piston 18 operates to thus establish a desired pressure within the container, not shown. Disposed within the pressure-adjusting knob 20 is a "dump" button 22 which, when pressed, locks piston 18 in its forward position so that openings 16 are in full communication with the inlet port 12. In this manner the container is depressurized. When the button 22 is pressed inwardly the pressure adjusting knob pops outwardly, along its rotational axis, to lock the dump button in the dump position, i.e., to depressurize the container. By simply pushing inwardly on the pressure adjusting knob 20, the dump button 22 is released from its locked "dump" position and the pressure in the container is restored. It is significant to note that no rotational adjustment of the knob 20 is necessary, the pressure will be the same as before the pressure dumping operation.

Housing 10 is adapted to receive a pressure gauge for initially adjusting the pressure and for ready removal of the gauge which thereafter is not necessary. An outer shell lock housing 24 is adapted to receive such a gauge, it being mounted on a pressure gauge receptacle hosing 26 extending from the pressure controller housing 10. After depressing the lock housing 24 toward controller housing 10, the stem of the pressure gauge not shown, may be inserted in the opening on the outer edge of the lock housing 24. After the stem has been inserted, the lock housing 24 is released from its depressed position and the gauge is locked in position for pressure readings. After pressure adjusting knob 20 has been rotated to obtain the desired pressure, the pressure gauge may be removed simply by depressing housing 24 and lifting the gauge out of the housing.

It should be noted before describing the construction and operation of this pressure controller that it may be used as a regulator or relief valve of a gaseous or liquid type and may be used to control pressure in a container either with or without a fluid flow. The basic advantage of the present controller, however, is that it will maintain a constant pressure within a container in the presence of a varied fluid flow through the container.

Reference is now had to FIG. 3 wherein is shown the internal structure for accomplishing the previously mentioned functions and advantages. Here is shown inlet port 12 to housing 10 terminating in a pressure chamber 28. Exhaust openings 16 are blocked from communication with pressure chamber 28 by piston 18 which is laterally movable across the openings to vary their cross-sectional area as a means of controlling fluid flow therethrough. Piston 18 consists of a piston head 30 having an annular wall 32. This wall has an antifriction liner and guide 34 preferably of Teflon material which facilitates movement of the piston within housing annular walls inwardly of exhaust cover 14. Ambient pressure sensing ports 38 in exhaust cover 14 communicate with the outer side of piston head 30, causing the piston to act as a diaphragm in response to the pressure differential between the pressure of fluid in chamber 28 and the combination of external ambient pressure and the tension on control spring 40. Control spring 40 is fastened at one end to piston head 30 and at the other end to a spring retainer and guide 42. Spring locking collar 44 fits over the end of spring 40 to retain it on guide 42. Guide 42 is threadedly engageable with a spring tension adjusting screw 46 and axially movable therealong upon its rotation. This screw 46 seats on a Teflon spacer bearing 48 and is journaled in an aperture 50 in wall 52 of housing 10. An O-ring 54 prevents fluid escape through the aperture. A spring retainer guide pin 56 is also mounted in wall 52 and extends across chamber 28 spaced from and parallel to the axis of screw 46. This pin prevents rotation of spring retainer and guide 42 when screw 46 rotates, causing the guide 42 to move axially along the screw and thus change the tension on spring 40. This may better be seen in the enlarged view in FIG. 4. Here it may be seen that the spiral of spring 40 is in a direction reversed from that of screw 46. The spring retainer and guide 42 has an outer surface threaded to fit the coils of the spring. Collar 44 is installed over the spring with a very tight fit. This forms a positive lock which tends to tighten more when turned.

Referring back to FIG. 3, the tension on spring 40, and thus the controlled pressure, is determined by rotation of adjusting screw 46. This is done by rotating the pressure-adjusting knob 20 which is connected to a pressure-adjusting knob housing 58 through a plurality of dump release limit screws 60. Housing 58, in turn, is fastened to screw 46 by locking pin 62. On the outer surface of wall 52 are a plurality of detents 64 into which slug 66 on knob housing 58 is urged by compression spring 68. This prevents knob 20 from accidentally being rotated out of adjustment.

An annular race 70 is formed on the inner wall of knob 20 to receive ball lock 72 which is seated in an aperture in the annular wall of housing 58. This is its normal position when the pressure control device is regulating the air pressure in the container. As previously stated, this pressure controller has the ability to dump the pressure and permit full and unrestricted fluid flow through openings 16. This accomplished by pushing inwardly on dump button 22. Screw 46 has an aperture through the axis thereof through which extends a dump push rod 74. This push rod is attached at one end to the dump button 22 and at its other end is a retaining cap 76. Compression spring 78 continually urges the dump button 22 outwardly, as shown. O-ring 80 maintains a fluid right seal. When the dump button is depressed, retaining cap 76 is urged against piston head 30 to move piston wall 32 away from openings 16.

When dump button 22 is depressed, it is automatically locked in this position. This is caused by annular race 82 in the outer wall of button 22 receiving ball lock 72 when they are in alignment. An outward pressure on knob 20 causes ball lock 72 to drop into race 82 when they are aligned. This outward pressure is caused by the compression springs 84 which are around limit screws 60 and which urge axial movement of knob 20 relative to its housing 58.

The dump button is unlocked and the desired pressure is restored simply by urging dump button release and pressure-adjusting knob 20 inwardly. When ball lock 72 and races 82 and 70 are aligned, compression spring 78 urges dump button 22 outwardly, causing ball lock 72 to move from race 82 on button 22 to race 70 on release knob 20. Once again the structure is in the position shown in FIG. 3 and the control device regulates the pressure in the container.

When rotating adjusting 20 to obtain the desired pressure, a pressure gauge, not shown, is used. This gauge has a stem that fits into opening 86 of pressure gauge receptacle housing 26. This housing has an outer shell lock housing 24 mounted thereover and is urged axially outwardly by compression spring 88. Ball locks 90 in the wall of housing 26 is urged inwardly against the gauge stem when housing 24 is in its outwardly urged position, as shown. When housing 24 is depressed, race 92 is in alignment with ball locks 92 and the gauge stem may be inserted or removed.

A spring 94, ball 96 and spring and ball retainer housing 98 with orifice 100 is mounted in the passageway between opening 86 and pressure chamber 28. When the stem of the pressure gauge is inserted it depresses ball 96 from its seal 102 to permit the gauge to read the pressure in the chamber. When the stem of the gauge is removed, the ball 96 and seal 102 engagement prevent fluid leakage and pressure loss.

Once the pressure has been regulated, the pressure required to move piston 30 outwardly will remain substantially constant although the fluid flow through the opening 16 may vary. For example, the pressure increases by only one-sixteenth when the rate of flow has increased four times. One contributor to this achievement is the use of as long a tension spring 40 as possible so that the relatively smaller movement of the piston 18 across the openings 16 does not change the tension force of the tension spring. Placing the spring laterally across the inlet port 12 permits use of a longer spring without extending the valve outwardly excessively from the pressure suit. Another factor is the unique combination of V seal 104 and the groove 106. The seal 104 is positioned at the trailing edge of piston wall 32 and the groove 106 is in the peripheral edge on the valve housing adjacent openings 16.

An enlarged sectional view of this combination is shown in FIG. 5. Groove 106 in one application is 0.062±0.004± across and from 0.020± to 0.030± deep. The tip 108 of seal 104 is centered relative to groove 106. If it extended further outwardly it would present too great a change in area with a resultant change in opening and closing pressures. If it does not extend to the center of the groove there will be a loss of lift. The surface of seal 104 has an angle of 20°±5° from normal toe the direction of travel of piston wall 32. Wall 32 has an inverted wedge shaped recess in its end to receive a similarly shaped base portion of the seal as a means of retaining the seal on the wall. The resultant lift effect of this groove and seal combination is a primary factor in improving the efficiency of this pressure control device. Most pressure regulators and pressure relief devices which utilize control springs derive their results as straight powers of the effective area of the diaphragm and the control spring tension. Thus with an increase in spring tension resulting from an increase in fluid flow, a proportional increase in pressure results. However, with the present combination groove and seal a lift factor is created on the piston that increases with fluid flow increase and essentially balances the increase in spring tension, thus maintaining virtually the same pressure as the cracking pressure, i.e., the pressure at which the piston first moves. This pressure remains virtually constant until the fluid flow becomes greater than the openings themselves can handle without a rise in pressure. This left effect is created by the inward slope of surface 110 of seal 104 which is exposed to fluid flow. This diverts fluid flow from the direction the piston is moving. This lift is somewhat like that in ground effect vehicles. A venturi effect is also created by the fluid flow passing through the smaller area between the tip 108 of the seal and the groove 106. It is actually possible to get enough lift on the piston with these combinations that the pressure with flow is slightly less than the cracking pressure of the relief valve or the set pressure of a pressure controller or regulator. This lift effect with flow also makes it possible to seat the seal on its closure, i.e., seal 104 seated on edge 112 of groove 106 with less pressure differential than with other systems because when the flow stops the lift also stops, thus causing the piston to close opening 16 more quickly.

In FIG. 6 there is shown a partial sectional view of a modification of the pressure control device shown in FIG. 3. In this modification an aneroid control actuates the piston when there is a decrease in ambient pressure. To accomplish this the piston is made free floating with a slip joint connection between the spring and piston. When ambient pressure drops enough to actuate the aneroid, the aneroid will take over and move the piston to the required position, even if the dump button has been depressed. In FIG. 6 parts identical with those in FIG. 3 bear identical identifying numerals. For example, inlet port wall 12, opening 16, annular wall 36, opening 38, spring 40, pressure-adjusting screw 46, guide pin 56, dump push rod 74, dump rod retaining cap 76, seal 104 and groove 106 are the same as in the first described device. Exhaust cover 14A, however, has an opening 114 therein in which is threadedly mounted an adjusting screw 116. An aneroid 118 fits within annular wall 36 and is responsive to changes in ambient pressure through openings 16 and 38. The aneroid 118 is attached to the adjusting screw 116 so that the base 120 of aneroid 118 may be adjusted in its spacing from the piston head 30A in its seated position, as shown. Aneroid 118 has a centrally disposed cylindrical sleeve 122 in which guide 124 is slidably mounted. A coating of Teflon 126 reduces friction. Piston head 30A is affixed to guide 124 and is movable therewith. Pin 128, fastened to the end of spring 40, has a head 130 against which the piston head 30A abuts to limit the upward movement of the piston head. Thus, upon proper adjustment of adjusting screw 46, further movement of piston head 30A depends upon the differential pressure between that of the fluid flow and the tension of spring 40. A sudden decrease in ambient air pressure increases the differential pressure and the piston head 30A is moved upwardly. However, with the decrease in ambient air pressure, aneroid 118 expands and base 120 abuts against piston head 30A to compensate for the decrease in pressure. Such an aneroid operated controller is particularly useful in pressurizing a space suit in outer space as a safety measure should a space capsule become depressurized.

An alternate embodiment of pressure controller is shown in FIGS. 7, 8 and 9. It may be used as an emergency pressure controller to relieve a container of excess pressure therein. Such a relief valve automatically compensates for changes in pressure due to change in volume and/or flow. The pressure-flow compensating seal and groove combination, together with a T-shaped piston which allows the full depth of the housing for the control spring hold the pressure increase under increased flow conditions down to very close to the cracking pressure of the valve. The top side of the piston actually senses ambient pressure and the bottom side reacts to the inside pressure so that the piston is reacting to the pressure differential, between the two, in its control function.

Inner housing 132 consists of a tubular guide 134, annular base 136 and upstanding wall 138 having openings 140 communicating with the inside of the container to which the valve is affixed. Outer housing 142 consists of an exhaust cover 144 having outlet ports 146 and an annular wall 148 having external threads for engagement with a container opening, not shown. Walls 138 of the inner housing 132 and 148 of the outer housing 142 are threadedly engageable and has an O-ring seal 150 that seals and also acts as a friction lock to prevent inadvertent change in adjustment. This adjustment enables the positioning of the combination seal 152 and groove 154 relative to the outlet ports 146. Withing tubular guide 134 is a T-shaped (in cross section) piston consisting of a washer-shaped piston head 156, extending between wall 138 and tubular guide 134, and a receptacle having a closed bottom 158 and Teflon coated sides 160 slidably engageable with tubular guide 134. A compression spring 162 extends to the undersurface exhaust cover 144 down into the receptacle. A slug 166 has an adjusting screw 168 rotatable by means of an Allen wrench insertable through opening 170 and which may be adjusted without disassembly. Rotation of screw 168 adjusts the distance of slug 166 from receptacle bottom 158. The bottom of spring 162 rests against the slug 166 and thus its compression is adjusted. In turn this determines the fluid flow pressure as controlled by the rise of piston head 156 against the pressure of spring 162. The same seal and groove combination, shown in the enlarged view in FIG. 9, is applicable to this relief valve as the pressure control devices previously described. This device creates a partial vacuum between exhaust cover 144 which tends to offset the load on the spring 162 which normally increases with outward pull and thus causes an increase in pressure.

Having thus described embodiments utilizing the present invention in sufficient detail to be understood by those skilled in the art, it is to be understood that other variations will readily occur and it is to be understood that these deviations and modifications are to be considered as part of the present invention.

We claim:
1. An automatic fluid flow compensating pressure control device comprising:
   a housing having an input opening and an exhaust port;
   an annular groove in said housing in a pathway between said opening and said port;
   a piston having an annular seal thereon;
   said seal being adapted to seat in said groove to block fluid flow to said exhaust port;
   pressure-adjusting means connected to said piston to regulate fluid pressure required to separate said seal from said groove;
   said pressure-adjusting means comprising a spring;
   rotatable means for adjusting the pressure of said spring on said piston;
   said seal having a surface inclined from normal to the direction of piston movement;
   said surface being adapted to seat on an edge of said groove and terminate substantially at a midpoint between the edges of said groove
   dump means to overcome the force of said spring on said piston; and
   said rotatable means being operable to inactivate said dump means and reestablish desired pressure of said spring on said piston.

2. An automatic fluid flow compensating pressure control device as in claim 1,
   said rotatable means including an adjusting knob having a central opening,
   a pushbutton mounted in said opening, said pushbutton being connected to move said piston upon inward depression thereof,
   locking means for retaining said pushbutton in depressed position, and
   means for releasing said pushbutton from said depressed position upon inward depression of said adjusting knob.

3. An automatic fluid flow compensating pressure control device as in claim 2,
   said locking means including a knob housing having an annular wall between said adjusting knob and said pushbutton,
   an aperture in said annular wall with a locking ball therein,
   annular grooves in the wall of said pushbutton and said adjusting knob whereby upon depression of said pushbutton said groove therein is aligned with and receives said locking ball and whereby inward depression of said adjusting knob realigns said groove therein with and receives said locking ball to thereby release said push button for outward movement to its original position.